United States Patent

[11] 3,589,831

| [72] | Inventors | Andrew Z. Lemnios<br>Longmeadow, Mass.;<br>Richard W. Hartswick, Granby; Richard<br>H. Hollrock, Simsbury, Conn. |
|---|---|---|
| [21] | Appl. No. | 875,288 |
| [22] | Filed | Nov. 10, 1969 |
| [45] | Patented | June 29, 1971 |
| [73] | Assignee | Kaman Corporation<br>Bloomfield, Conn. |

[54] CONTROL SYSTEM FOR ROTARY WING VEHICLE
7 Claims, 4 Drawing Figs.

| [52] | U.S. Cl. | 416/24,<br>416/40, 416/132, 416/114 |
|---|---|---|
| [51] | Int. Cl. | B64c 27/74 |
| [50] | Field of Search | 416/24,<br>113—119, 40, 132, 228 |

[56] References Cited
UNITED STATES PATENTS

| 2,581,773 | 1/1952 | Stalker | 416/114 |
|---|---|---|---|
| 2,611,344 | 9/1952 | Vanderlip et al. | 416/114 |
| 2,620,888 | 12/1952 | Avery | 416/114 |
| 2,748,876 | 6/1956 | Daland et al. | 416/118 (X) |
| 3,065,933 | 11/1962 | Williams | 416/228 (X) |

*Primary Examiner*—Everette A. Powell, Jr.
*Attorney*—McCormick, Paulding & Huber

ABSTRACT: A control system for a helicopter rotor has dual pitch changing mechanisms, one such mechanism for the inboard ends of the blades, and a second for servo flap control of an outboard station of each blade. Conventional cyclic and collective controls are provided in the vehicle, and the dual mechanisms operate in unison at moderate forward speeds, but function differentially at higher speeds to cyclically twist the rotor blades according to a predetermined airspeed schedule so that the advancing and retreating blades are cyclically twisted to reduce and to increase, respectively, the built-in negative twist of the torsionally resilient rotor blades.

PATENTED JUN29 1971

INVENTORS
ANDREW Z. LEMNIOS
RICHARD W. HARTSWICK
RICHARD H. HOLLROCK

BY *McCormick, Paulding & Huber*

ATTORNEYS

CONTROL SYSTEM FOR ROTARY WING VEHICLE

BACKGROUND OF INVENTION

Rotary wing systems generally include no more than one pitch-changing mechanism for cyclically and collectively varying the pitch of the rotor blades as they are rotated by a driven hub. One conventional pitch-changing mechanism utilizes a pitch horn on each blade and a vertical push-rod with its upper end connected to the pitch horn and its lower end carried on the rotating portion of an azimuth mechanism commonly referred to as a swashplate. The swashplate has a nonrotating portion which is movable axially to vary the collective pitch of the rotor blades, and which is tiltable to vary the cyclic pitch of the rotating blades. Another type of pitch changing mechanism is the so called "servo flap" design wherein a flying tab is provided at an outboard station of each blade and its pitch controlled by a mechanism such as that just described. Thus, movement of the servo flap, or flying tab, then imparts pitching moments to the overall blade which is pivotably supported in the rotor hub in the usual manner.

Both of the above-described rotor systems, and in fact most present day designs for such rotary wing systems involve many design compromises to facilitate operation of a vehicle equipped with such a system throughout a predetermined flight spectrum. For example, the rotating blades are usually provided with some predetermined degree of negative built-in twist in order to operate in the hover and low speed portion of the conventional helicopter flight spectrum. While a relatively high negative built-in pitch is preferable in the hover and low speed regime in order to minimize power requirements, the usual practice is to compromise the amount of built-in twist here in order to permit operation at higher forward speeds. In the latter regime lower built-in negative blade twist is desirable in order to minimize vibratory loads. At high forward speeds each blade has a speed which is cyclically increased as it advances in the forward direction, and therefore, the outboard portion of the blade with excessive negative pitch tends to produce a vibrating load on the system. Ideally, this outboard portion should have its negative built-in pitch decreased as it advances, and then increased slightly as it retreats. However, the usual practice is to provide a blade with moderate built-in negative twist geometry and accept some disadvantages at the very low and the very high forward speed regimes.

The present invention provides a rotary wing system wherein twist of the rotor blades can be cyclically varied throughout the entire forward speed regime to make the usual compromise in built-in blade twist less critical to the limits of the vehicle's flight spectrum, especially to the limits of its forward speed.

SUMMARY OF INVENTION

A control system for a rotary wing vehicle, such as a helicopter, has dual pitch-changing mechanisms, both of which can be operated in unison by the pilot through conventional controls. One mechanism operates through a pitch horn on the inboard end of each blade, and the other through a servo flap at an outboard station of each blade. The blades are torsionally resilient, being made up of a reinforced material and may have a slight built-in negative twist in the range between −5° to −10°. Means is provided for varying the output of one of the pitch changing mechanisms with respect to the other so that the blades can be twisted cyclically in accordance with a predetermined schedule of forward speed. That is, the slight built-in negative twist of the blade can be varied in response to changes in forward speed to collectively increase the negative twist of the blades at hovering speeds, and/or to cyclically decrease and increase the negative twist of each blade as it advances and retreats at relatively high forward vehicle speed.

DETAILED DESCRIPTION

Figure 1:
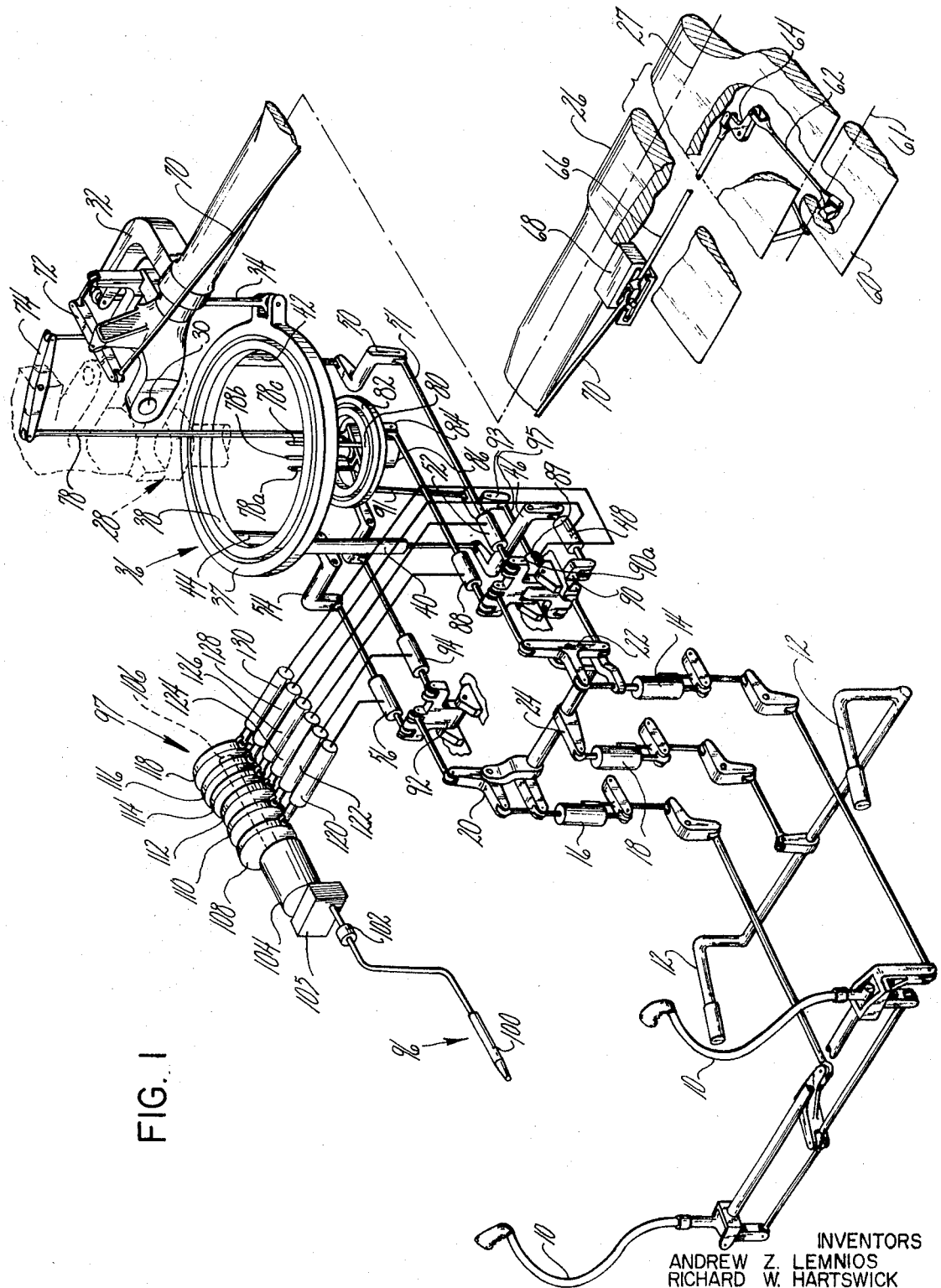
FIG. 1 is a perspective view of a dual pitch-control mechanism constructed according to the present invention, and also shows schematically the means for operating these distinct mechanisms either in unison or differentially in accordance with variations in vehicle speed.

Turning now to the drawings in greater detail, FIG. 1 shows a rotary wing system for use in a vehicle such as a helicopter or the like. A dual set of cyclic and collective pitch control columns are indicated generally at 10 and 12 respectively for use in a helicopter having two side-by-side pilots. Both control columns 10 and 12 are connected for movement in unison with one another through conventional linkage, and it will be apparent that the cyclic pitch control levers provide input to the two hydraulic boost cylinders 14 and 16, and that the collective pitch control levers provide an input to the hydraulic boost cylinder 18. Thus, boosted control is available to the lateral and longitudinal cyclic pitch control bellcranks 20 and 22. The output of the hydraulic boost cylinder 18 is provided to the collective pitch control lever 24 and, as is conventional with such rotary wing control systems, movement of either of the collective pitch control columns 12, 12 also serves to provide incremental displacements of the lateral and longitudinal cyclic pitch control levers, 20 and 22.

In accordance with the present invention, the outputs from the above described portion of the control system are split for operation of a dual pitch-control mechanism to be described. The first pitch-changing mechanism includes first means for cyclically varying the pitch of an inboard section, and more particularly of the root end, of the blade 26 in response to lateral and longitudinal cyclic pitch lever displacements. The inner radial end of the blade 26 is conventionally supported, pivotally, in the rotor hub indicated generally at 28, and more particularly is supported on a hinge pin 30 so as to be adapted for flapping or coning movement about said hinge pin axis, and is also free to pivot or pitch about the longitudinal axis of the rotor blade 26 except for the blade being restrained by the pitch-changing mechanisms to be described. The single rotor blade shown is for illustration only, it being apparent that any number of blades might be mounted in the hub 28. The first pitch-changing means includes a pitch horn 32 mounted at the root end of the blade and the horn has a radially inwardly extending portion which is connected to a generally vertically extending push rod 34. The generally vertically extending pushrod 34 rotates with the hub, and is connected at its lower end to the rotating portion of the azimuth mechanism, or swashplate indicated generally at 36. The swashplate 36 includes an inner nonrotating portion 38 which is adapted to be tilted with respect to the axis of the rotor hub, and which is also free to slide axially with respect thereto in a conventional manner. More particularly, three vertical support or input mechanisms are provided as shown at 40, 42 and 44 in order to tilt and to axially move the nonrotating portion 38 of the swashplate in response to inputs provided thereto by the rotor control system. For example, the forward vertical displacement actuator 40 is connected at its lower end to a lever 46, which lever is in turn adapted to rotate in response to limited displacement of the longitudinal cyclic pitch control lever 22 described hereinabove. The lever 46 has a servo actuator 48 located in series therewith, one end being connected to the yoke member 90 and thence to the lever 22, the other end to said lever 46 for a purpose to be discussed hereinafter. So too, the aft vertical displacement actuator 42 is connected at its lower end to a lever 50, which lever is adapted to be rotated on its axis as a result of opposite angular displacement of the longitudinal cyclic pitch control lever 22 through a push rod 51. A servo actuator 52, similar to the actuator 48, is located in series with the pushrod 51, one end being connected through the yoke 90a to the pitch lever 22, and the other end to the pushrod 51 for a purpose to be discussed hereinafter. The third vertical displacement actuator 44 carried by the nonrotating portion 38 of the swashplate 36 is connect at its lower end to a lever 54, which lever is adapted to be rotated on its axis as a result of limited angular displacement of the lateral cyclic pitch control bellcrank 20 through an intermediate pushrod and associated actuator 56. The actuator 56 serves a similar function to the actuators 48 and 52 described above, except that said actuator 56 is connected through the yoke 92 to the lateral pitch lever 20.

In further accordance with the present invention a second means is provided for cyclically changing the pitch of an outboard section of the rotor blade 26 either in unison with the first mentioned means or in opposition thereto so as to cause a predetermined degree of twisting of the rotor blade in torsion with respect to the longitudinal axis 27. Preferably, said second pitch-changing means comprises a servo flap 60 pivotally supported at an outboard station of the rotor blade 26 and movable on its axis 61 by a pitch-changing mechanism carried in part in the rotor blade 26. As so constructed the servo flap 60 acts as a flying tab with respect to the rotor blade itself in response to predetermined inputs. As shown schematically in the drawings, movement of the servo flap 60 is achieved through a short push rod 62 having one end pivotally connected to the servo flap 60, and the other end pivotally connected to a bellcrank 64 rotatably supported on a generally upright axis in the main motor blade 26. The other arm of the bellcrank 64 is pivotally connected to a slide rod 66. The inboard end of the side rod 66 is slidably received in a housing 68, and is thereby restrained in a spanwise direction with respect to the blade 26. A control rod 70 is also slidably received in the housing 68 at its outboard end and is pivotally connected to the slide rod 66. A generally horizontal lever 72 is pivotally carried at the inboard end of the blade and moves on a vertical control axis to impart limited spanwise motion to the said control rod 70. More particularly, the horizontal lever 72 is oriented in generally parallel relationship to the blade-flapping axis defined by the hinge pin 30. Angular horizontal displacements of the lever 72 is transmitted, through an appropriate linkage 74, from displacement of a vertical pushrod 78 located inside the hollow rotor hub. The lower end of the single pushrod 78 shown is carried on a rotating portion 80 of a second swashplate or azimuth mechanism, and the nonrotating portion of the swashplate or azimuth mechanism is adapted to tilt the swashplate and to move it axially with respect to the axis of the rotor hub in a conventional manner. Other blades might be similarly linked to the rotating swashplate as indicated by the vertical pushrods 78a, 78b and 78c. More particularly, the nonrotating portion 82 of the second swashplate is adapted to be tilted through a depending arm 84 to provide for longitudinal cyclic pitch changes. The lower end of the arm 84 is connected, through a pushrod 86 to a servoactuator 88 and through a yoke member 90a to the longitudinal cyclic pitch bellcrank 22 mentioned hereinabove. Thus, displacement of the pushrod 86, and hence fitting movement of the second swashplate 82, is achieved conventionally through angular displacement of the longitudinal cyclic pitch control lever 22. The pushrod 86 has a servo actuator 88 in series therewith, and its function will be described hereinbelow with reference to the means 97.

Tilting of the second swashplate 82 for achieving lateral cyclic pitch control of the rotor is achieved through a similar linkage connected to a yoke member 92 which serves essentially the same function as the member 90a. A servo actuator 94 allows programmed adjustments to be made to the swashplate 82 at the same time during which conventional changes are being made through the lateral pitch control lever 20.

Collective pitch control of the second swashplate 82 is achieved through the foregoing linkages, plus a vertical pushrod 91 connected at its lower end to a bellcrank 93 and through a horizontal pushrod 95 to the yoke member 90 which is in turn connected to the longitudinal pitch control lever 22. The pushrod 95 carries a servo actuator 89 in series therewith, and the function of this actuator 89 is to allow programmed changes to be made to the swashplate 82 at the same instant of time during which conventional changes are being made through the longitudinal pitch control lever 22 as a result of manipulation of the control column 10.

In accordance with the present invention, means is provided for cyclically and collectively adjusting the inputs to one or more of the six actuators 48, 52, 88, 89, 56, and 94, to achieve the objects of the present invention. Said means indicated generally at 97 is rendered responsive to the forward speed of the vehicle, through suitable means 96, and the linear servo actuators 48, 52, and 56 are adapted to vary the orientation of the first swashplate, and actuators 88, 89 and 94 that of the second swashplate, so as to vary the twist of the resilient blade, or blades, as they rotate in accordance with a predetermined airspeed schedule.

Figure 2:
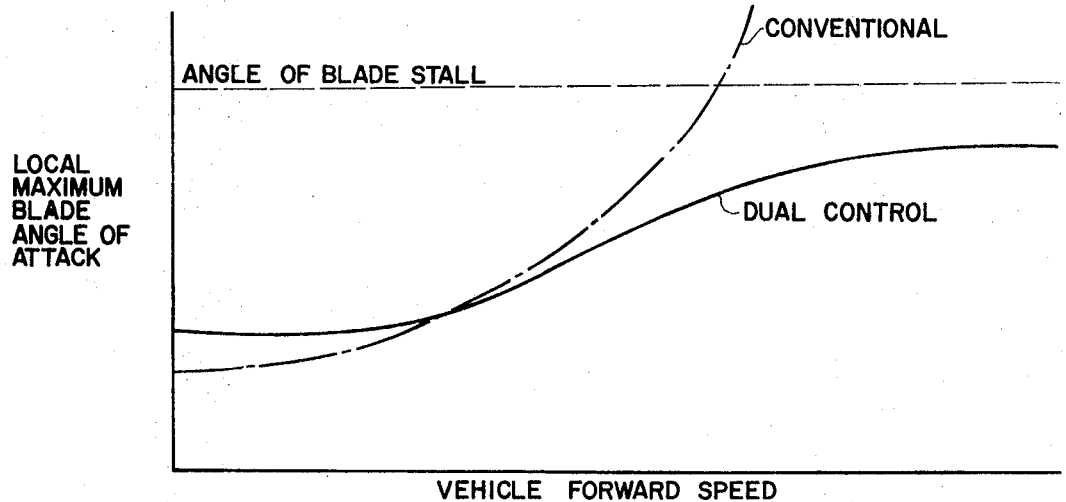
FIG. 2 is a graphical plot of the local variation in maximum blade angle of attack with forward speed in a vehicle equipped with a conventional blade pitch-changing mechanism and in a vehicle equipped with a dual pitch-changing mechanism of the present invention.
Figure 3:
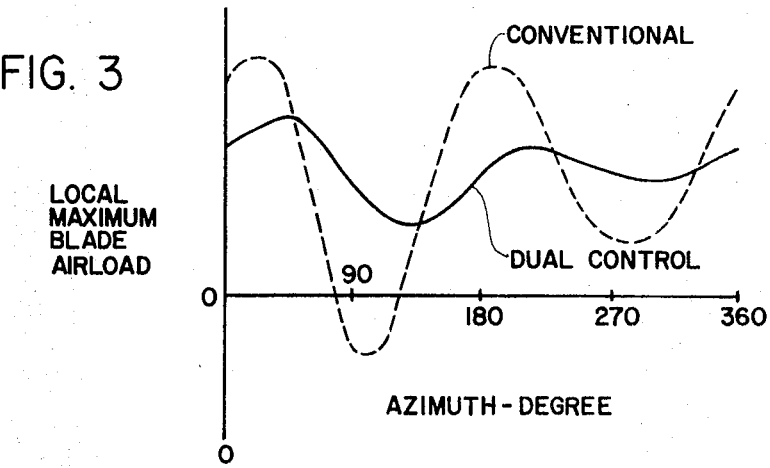
FIG. 3 is a graphical plot of the local variation in maximum blade air load at a relatively high forward speed for both a conventional pitch-changing mechanism and a dual mechanism of the present invention.
Figure 4:
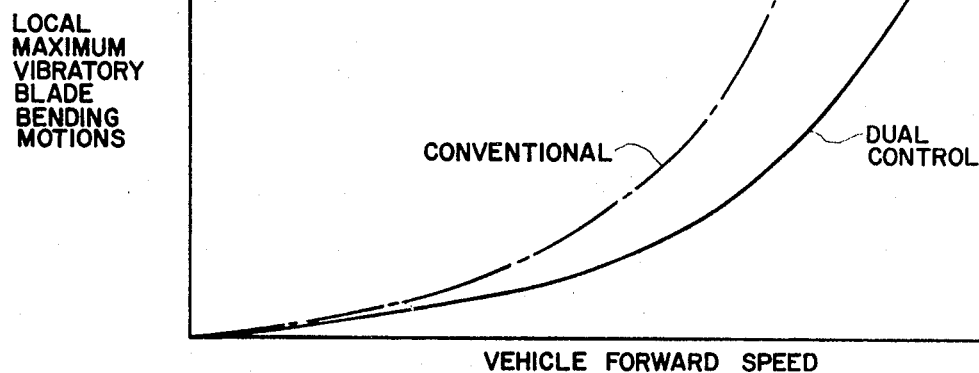
FIG. 4 is a graphical plot of the local variation in maximum blade vibratory bending motion with forward speed in a vehicle equipped with a conventional blade pitch-changing mechanism and in a vehicle equipped with a dual pitch-changing mechanism of the present invention.

More particularly, the means 97 and 96 reduces the negative built-in twist of the rotor blade as it is advanced during high speed forward flight of the vehicle, and increases the negative built-in twist of said blade while it is retreating during such forward flight thereby, controlling the local blade angle of attack and as a result thereof, significantly reducing the vibratory air loads imposed on the rotary wing system. FIGS. 2 and 3 show graphically the advantages to be gained as a result of installing a dual pitch-control system in a vehicle utilizing said programmed cyclic pitch-changing means to alter the angle of attack or pitch of the blades as they rotate, especially during high speed forward flight. Said means 96 and 97 also serve to increase the negative twist of all of the rotor blades during low speed forward flight, and especially during hovering maneuvers. As shown schematically in FIG. 1 a Pitot-static tube 100 is provided for generating a pressure signal indicative of the vehicle's airspeed. Transducer means 102 is provided for converting the pressure signal into an electrical signal which is amplified by amplifying means 105. The amplified signal drives a servo angular positioner 104 which rotates a shaft 106 through a predetermined angular displacement, which shaft angle bears a predetermined relationship to the vehicle's speed. A plurality of cams 108, 110, 112, 114, 116, and 118 are carried on the shaft 106 for producing programmed linear displacements of the linear potentiometers, 120, 122, 124, 126, 128 and 130 respectively. The output of each potentiometer comprises an input to each of the linear servo actuators 48, 52, 56, 88, 89, and 94. Each of the linear potentiometers 120, 122, 124, 126, 128, and 130 has cam follower means at its movable end portions which is adapted to follow the contour of one of the precut cams for producing a predetermined displacement in response to a predetermined angular displacement of the shaft 106.

The single rotor blade shown is intended to be representative of a plurality of such blades, and it will be apparent to those skilled in the art that the exact number of rotor blades employed in a rotor system construct in accordance with the present invention might be varied to meet the power requirements of a particular helicopter design. Each of the rotor blades preferably comprises a torsionally resilient, or elastic member, which can tolerate a range of differences in pitch between its inboard end and an outboard station so as to provide a variable degree of warping or twist of the rotor blade for achieving the objects of the present invention. The use of the servo flap design for achieving a predetermined pitch of the rotor blade at an outboard station is of particular usefulness in carrying out the present invention, and a conventional pitch horn at the root end of the blade provides a convenient reactive device for permitting predetermined twisting of the rotor blades either cyclically in order to decrease negative twist of the advancing blade at high forward speeds and to increase this twist as the blade retreats or to permit reducing the power requirements for hovering by collectively increasing the negative built-in twist as the speed of the vehicle decreases.

We claim:

1. In a rotary wing vehicle having cyclic and collective pitch controls, the improvement comprising a rotor hub having at least one generally radially extending blade, said blade having a built-in negative twist geometry, first means for cyclically and collectively changing the pitch of an inboard section of the blade in response to control inputs, second means for cyclically and collectively changing the pitch of an outboard section of the blade in response to control inputs, and means responsive to the forward speed of the vehicle for cyclically and collectively adjusting the input to at least one of said pitch-changing means with respect to the other to reduce the negative built-in twist while the blade is advancing during forward flight of the vehicle.

2. The combination defined in claim 1 wherein said means for cyclically adjusting the input to one of said pitch-changing means with respect to the other also serves to increase the negative built-in twist of said blade while it is retreating during forward flight of the vehicle.

3. The combination defined in claim 2 wherein said second pitch-changing means comprises a servo flap pivotally mounted at said outboard blade station, linkage means carried by the rotor hub for operating said servo flap, and means including a swashplate for operating said linkage means in response to said vehicle cyclic and collective pitch controls.

4. The combination defined in claim 3 wherein said first pitch-changing means comprises a pitch horn adjacent the inboard end of the blade, linkage means carried by the rotor hub for operating said pitch horn, and means including a swashplate for operating said linkage means in response to said vehicle cyclic and collective pitch controls.

5. The combination defined in claim 4 wherein said means for adjusting the inputs to said first and second pitch-changing means includes an airspeed indicator producing a pressure signal indicative of vehicle speed, transducer means for converting the pressure signal into at least one displacement signal, and boosted means for varying said pitch input to said pitch-changing means in response to said displacement signal.

6. The combination defined in claim 5 wherein said transducer means comprises means for first converting said pressure signal into an electrical signal, servo means for converting said electrical signal into an angular displacement signal, a plurality of camming devices adapted for movement in response to angular displacement of said servo means, and cam follower means for engagement with each of said camming devices for producing a predetermined linear displacement in response to a predetermined angular displacement of said servo means.

7. The combination defined in claim 6 wherein each of said swashplates includes a portion which rotates with the rotor hub and a nonrotating portion which is constrained to tilt and to move axially with respect to the axis of rotation of said rotor hub, and at least three pushrods connected to said nonrotating portion of one of said swashplates for moving said swashplate either axially or to tilt it with respect to said axis of rotation, said predetermined linear displacements being applied to said pushrods through said boosted means.

PO-1050
(5/69)

UNITED STATES PATENT OFFICE
CERTIFICATE OF CORRECTION

Patent No. 3,589,831          Dated June 29, 1971

Inventor(s) Andrew Z. Lemnios, Richard W. Hartswick, Richard H. Hollrock

It is certified that error appears in the above-identified patent and that said Letters Patent are hereby corrected as shown below:

On the title page, change the assignee from "Kaman Corporation" to --Kaman Aerospace Corporation--.

Signed and sealed this 30th day of May 1972.

(SEAL)
Attest:

EDWARD M.FLETCHER,JR.          ROBERT GOTTSCHALK
Attesting Officer          Commissioner of Patents